(12) United States Patent
Xie et al.

(10) Patent No.: US 6,884,529 B2
(45) Date of Patent: Apr. 26, 2005

(54) METHOD OF HEATING UP A SOLID POLYMER ELECTROLYTE FUEL CELL SYSTEM

(75) Inventors: Tuyu Xie, Kingston (CA); Paul M. Simmons, Kingston (CA); Scott B. Fulton, Kingston (CA)

(73) Assignee: E. I. du Pont Canada Company, Mississauga (CA)

( * ) Notice: Subject to any disclaimer, the term of this patent is extended or adjusted under 35 U.S.C. 154(b) by 73 days.

(21) Appl. No.: 10/066,720

(22) Filed: Feb. 6, 2002

(65) Prior Publication Data

US 2003/0148149 A1 Aug. 7, 2003

(51) Int. Cl.$^7$ ............................................. H01M 8/04
(52) U.S. Cl. ............................. 429/13; 429/24; 429/26
(58) Field of Search ................................. 429/13, 24, 26

(56) References Cited

U.S. PATENT DOCUMENTS

| | | | |
|---|---|---|---|
| 5,798,186 A | 8/1998 | Fletcher et al. | 429/13 |
| 6,068,941 A | 5/2000 | Fuller et al. | 429/13 |
| 6,258,474 B1 | 7/2001 | Diethelm et al. | 429/26 |
| 6,329,089 B1 | 12/2001 | Roberts et al. | 429/13 |
| 2003/0003336 A1 * | 1/2003 | Colbow et al. | 429/24 |

FOREIGN PATENT DOCUMENTS

| | | |
|---|---|---|
| JP | 56114284 | 9/1981 |
| JP | 62010877 | 1/1987 |
| JP | 05307970 | 11/1993 |
| WO | WO00/30200 | 5/2000 |
| WO | WO00/65677 | 11/2000 |
| WO | WO01/03216 | 1/2001 |
| WO | WO 01/52339 | 7/2001 |
| WO | WO 03/003494 | 1/2003 |

OTHER PUBLICATIONS

PCT/CA02/01444 International Search Report dated Jul. 10, 2003.

\* cited by examiner

*Primary Examiner*—Susy Tsang-Foster

(57) ABSTRACT

A method is disclosed to heat a direct methanol fuel cell stack system at start-up without using any external energy source. During the start-up period, the fuel cell stack is at open circuit state so that the fuel cell stack is not connected to any external circuit. The methanol solution introduced at the anode side of the fuel cell stack will diffuse through the proton conductive membrane to the cathode side of the fuel cell stack. The methanol diffused from the anode side will be oxidized at the cathode side by oxygen in the air stream. This oxidation reaction generates heat that heats up the fuel cell stack and the system. The concentration of methanol in the methanol solution can be varied depending on the initial stack temperature. The lower the initial stack temperature, the higher the concentration of the methanol solution required. At an initial stack temperature of −40° C., a solution having 40 wt % methanol is preferred to avoid freezing of the solution. If the initial stack temperature at start-up is above the freezing point of water, the methanol concentration in the solution can be in a range of 0.5 to 25 wt %, with a more preferred concentration range being from 3 to 10 wt % of methanol. The methanol solution and air feed rates can also be varied to control the rate at which heat is generated in the stack.

18 Claims, 4 Drawing Sheets

METHOD OF HEATING UP A SOLID POLYMER ELECTROLYTE FUEL CELL SYSTEM

FIELD OF THE INVENTION

This invention relates to solid polymer electrolyte fuel cells, and more particularly to a method for heating up a direct methanol fuel cell (DMFC) on start-up, especially where the ambient temperature is below the freezing point of water.

BACKGROUND OF THE INVENTION

Solid polymer electrolyte fuel cells employ a membrane comprising a solid polymer electrolyte disposed between two porous electrically conductive electrodes, the anode and the cathode. The anode and cathode include catalysts layers, gas diffusion layers and conductive flow field plates. Fuel is fed into the anode, diffusing onto the porous catalyst layer, and is oxidized to produce electrons and protons (and $CO_2$ as a by-product if methanol is used as the fuel). The polymer electrolyte membrane is proton conductive, in which the protons migrate towards the cathode. Oxidant, at the same time, is fed to the cathode. The oxidant diffuses onto the porous cathode catalyst layer and reacts with the protons and electrons, producing water as a by-product. The electrons travel from the anode to the cathode through an external circuit, thus producing the desired electrical power.

In stationary power applications, fuel cell systems may be required to operate continuously for a long period of time. However, in portable or traction power applications, fuel cell systems may be subjected to frequent start-up and shut down cycles. In either case, a fuel cell system must undergo a start-up process before generating the desired electrical power. On start-up, the initial system temperature will be below the normal operating temperature of the fuel cell system, and in some cases the initial temperature may be below the freezing point of water. Power output from the fuel cell system decreases with a decrease in temperature. Therefore, it is desirable to be able to start-up a fuel cell system at various initial ambient temperatures and to heat up the fuel cell system to a desired normal operating temperature. It is a challenge to heat up a cold fuel cell system quickly and safely in any application.

Conventional approaches for starting up a fuel cell include employing an external power source or a heater to heat the fuel cell to the desired operating temperature. However, this requires additional equipment just for start-up purposes.

U.S. Pat. No. 5,798,186 issued to Ballard Systems recognizes the advantage of being able to start-up a fuel cell at temperatures below freezing without the help of an external heating source. The patent teaches a method of heating up a hydrogen fuel cell system by connecting the fuel cell stack to an external circuit when hydrogen and oxidant are fed into the fuel cell stack. The effective resistance of the external circuit may be decreased so that the fuel cell stack is effectively short circuited for a period of time. This method leads to maximum electrochemical reaction rates, and the consequent generation of heat. However, localized hot spots in the proton conductive membrane can occur due to high current generation, particularly in a short circuit condition.

U.S. Pat. No. 6,068,941 discloses a method for starting up a hydrogen fuel cell system by adding an alcohol solution into the fuel cell cooling loop when the system is shut down. Upon start-up, air is fed into the cathode to oxidize the alcohol diffused from the cooling system. In this case, the cathode flow field plate must be made of materials with significant permeability to alcohol to allow the alcohol to diffuse to the cathode catalyst layer. This patent discloses a hydrogen fuel cell that requires a separate supply of methanol for use only during start-up. Thus, added complexity is introduced. Further, upon shut down of the fuel cell, the methanol is introduced into the coolant passages on the cathode side of the cell. The methanol must diffuse to the cathode catalyst layer through the cathode flow field plate, where it reacts with air.

PCT published application WO 00/65677 discloses a method of heating up a DMFC by feeding hydrogen into the anode and air into the cathode of the DMFC during short-circuit operation. The system is switched to methanol as the fuel once the desired operating temperature is reached. Thus, two supplies of fuel are necessary.

PCT published application WO 01/03216 discloses a method to heat up a hydrogen fuel cell stack by providing a heating element in the heating/cooling loop. Thus, a separate heating device is used to heat the fuel cell on start-up.

U.S. Pat. No. 6,329,089 discloses a fuel or oxidant starvation method in which fuel or oxidant supply is restricted so that the over-potential of fuel cell stack is increased. This over-potential is used as the heating source to heat up the fuel cell stack. Hydrogen or reformate is used as fuel. Again, in this method the fuel cell stack is connected to an external circuit during the heat up period. When the fuel is starved, local high temperature conditions may occur due to non-uniform current distribution. When oxidant is starved, fuel cell voltage reversal may occur.

In all these previously disclosed methods, fuel cell stack and related systems are heated. However, these methods may either cause localized hot spots in the proton conductive membrane and its potential safety issues or make the fuel cell system more complex because additional equipment and systems are needed.

Therefore there is a need for a simple and safe method to heat up a direct methanol fuel cell system.

SUMMARY OF THE INVENTION

In accordance with one aspect of the present invention, there is provided a method of heating a fuel cell from an initial temperature to a desired temperature higher than the initial temperature, wherein the fuel cell comprises an anode comprising an anode flow field plate, an anode diffusion layer and an anode catalyst layer, a cathode comprising a cathode flow field plate, a cathode diffusion layer and a cathode catalyst layer, and a proton conductive membrane, the method comprising the steps of:

(a) operating the fuel cell at an open circuit state;
(b) feeding at a fuel feed rate an aqueous fuel solution to the anode and feeding at an oxidant feed rate an oxidant to the cathode;
(c) allowing fuel in the fuel solution to diffuse through the proton conductive membrane from the anode to the cathode; and
(d) oxidizing the fuel at the cathode to generate heat, thereby heating the fuel cell.

BRIEF DESCRIPTION OF THE DRAWINGS

The preferred embodiments of the present invention will be described with reference to the accompanying drawings in which like numerals refer to the same parts in the several views and in which.

DETAILED DESCRIPTION OF THE PREFERRED EMBODIMENTS

The preferred embodiments of the present invention will now be described with reference to the accompanying figures.

For the purposes of this application, the term "anode" is used to describe the component of the fuel cell comprising the anode flow field plate, anode gas diffusion layer and anode catalyst layer. The term "cathode" is used to describe the component of the fuel cell comprising the cathode flow field plate, cathode gas diffusion layer and cathode catalyst layer.

The term "anode side" is used in reference to the fuel cell stack and refers to that side of the fuel cell stack that is negatively charged. The term "cathode side" is used in reference to the fuel cell stack and refers to that side of the fuel cell stack that is positively charged.

The term "stack" refers to a fuel cell stack comprising a series of fuel cells functioning in tandem electrically.

A characteristic of direct methanol fuel cells using solid polymer electrolyte membranes is that an aqueous methanol solution is directly used as the fuel. The methanol solution is fed to the anode of the cell, while air is introduced at the cathode. The inventors have found that such a DMFC system can be heated at start-up without using any external energy source as heating.

During the start-up period, a fuel cell stack comprising DMFCs is operated at open circuit state, that is, the fuel cell stack is not connected to any external circuit. The methanol solution introduced at the anode side will diffuse through the proton conductive membrane to the cathode side. Because the stack is at an open circuit state, there is no electrochemical reaction, taking place at the anode side. However, the methanol diffused from the anode side will be oxidized at the cathode side by oxygen in the air stream. This oxidation reaction will generate heat that will heat up the fuel cell stack and the system.

The concentration of methanol in the methanol solution can be varied depending on the initial stack temperature. The lower the initial stack temperature, the higher the concentration of the methanol solution required. For example, at an initial stack temperature of −40° C., a solution having 40 wt % methanol is preferred to avoid freezing of the solution. If the initial stack temperature at start-up is above the freezing point of water, the methanol concentration in the solution can be in a range of 0.5 to 25 wt %, with a more preferred concentration range being from 3 to 10 wt % of methanol. The methanol solution and air feed rates can also be varied to control the rate at which heat is generated in the stack.

Once the fuel cell stack temperature goes above the freezing point of water or above the ambient temperature after open circuit start-up, the stack can be connected to an external circuit to accelerate the heating up process. Upon closing the circuit, electrochemical reactions will occur at both the anode side and cathode side, generating additional heat.

Figure 1:
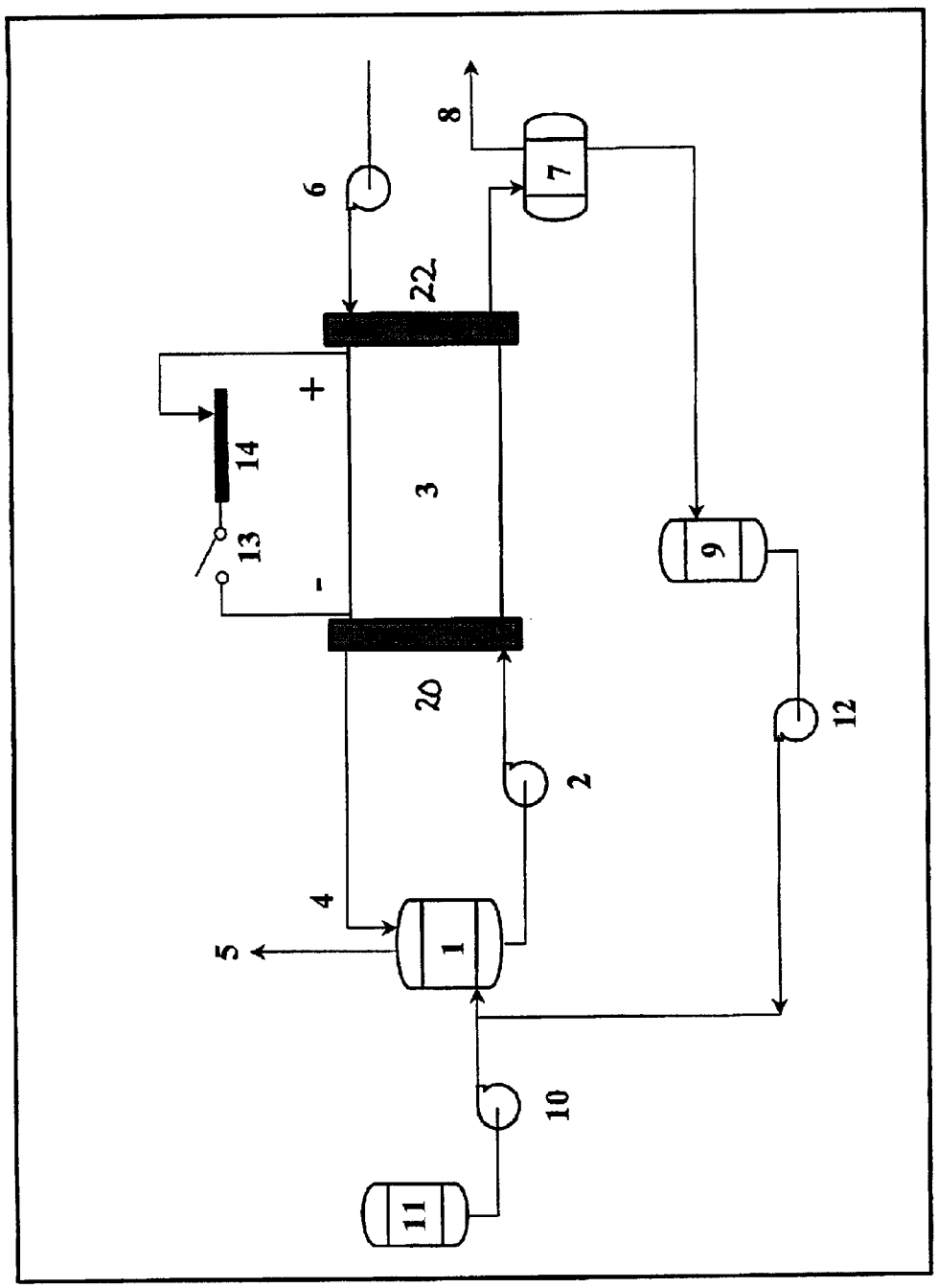
FIG. 1 is a schematic drawing showing a DMFC operating system including a DMFC stack, fuel and oxidant supplies, and fuel and water recycles.

FIG. 1 is a schematic diagram of a DMFC stack system. An aqueous methanol solution from reservoir 1 is pumped through pump 2 to the anode side 20 of the DMFC stack 3, whereas unreacted methanol solution is recycled back to reservoir 1 through tubing 4. The reaction by-product carbon dioxide is vented through tubing 5 to a residual methanol recovery device (not shown). At the same time, air is pumped through pump 6 to the cathode side 22 of the DMFC stack 3. Unreacted air and by-product water flow from the cathode side 22 into a condenser 7. The residual air is then vented from the condenser 7 through tubing 8 and the water is recycled back to a water reservoir 9.

When the methanol concentration of the methanol solution in reservoir 1 is low, a control signal (not shown) will start pump 10 to add methanol to reservoir 1 from methanol reservoir 11, thereby increasing the solution's concentration. If the methanol concentration of the solution is too high or the liquid level in reservoir 1 is too low, a control signal (not shown) will start pump 12 to add water to reservoir 1.

Switch 13 represents connecting or disconnecting the DMFC stack 3 to an external circuit or load 14.

During the heating up period at start-up, aqueous methanol solution is fed from reservoir 1 into the anode side 20. The methanol is distributed to each fuel cell within the stack 3 by a manifold system, not shown. A single pass conversion of methanol is low, particularly at an open circuit state with switch 13 in the open state. Therefore, most of the aqueous methanol solution is recycled back into reservoir 1 through piping 4. Thus, heating up of the DMFC stack 3 is different from that of a hydrogen fuel cell system. In addition to heating the stack 3, the solution in the reservoir 1 is also heated up by the recycling stream.

At the open circuit state, the methanol crossover rate is at maximum. That is, the rate of methanol diffusion from the anode side 20 to the cathode side 22 is greatest. Methanol diffused to the cathode side 22 is oxidized, which generates heat that will heat up the stack 3. Thus, the fuel stream from the anode side 20 is also heated up. The heat carried by the recycled fuel stream through piping 4 into reservoir 1 also heats up the methanol solution in reservoir 1. With this increase in the temperature of the solution in reservoir 1, the fuel inlet temperature also increases accordingly. Thus, a part of the heat carried by the fuel recycle stream can be used to heat up the stack further. Because electrochemical reactions do not occur at the anode side at the open circuit state, there is no carbon dioxide production during this heat up process. Thus, the effect of gas on heat transfer resistance is also eliminated.

When temperature of stack 3 reaches a point above the ambient temperature, the stack 3 may be connected to the external circuit 14 by closing switch 13 to accelerate the heating up process. When the temperature of the stack 3 reaches its normal operating temperature, the methanol solution concentration may be adjusted to the desirable operating concentration level.

The concentration of methanol in the solution used at start-up for initially heating up the stack 3 may be the same as the normal operating concentration, or it may be higher than the normal operating concentration. In general, a higher methanol concentration is preferred at start-up in order to maximize the methanol diffusion rate to the cathode side 22, and thereby increase the heat generation rate. The preferred methanol concentration range for the start-up operation depends on the initial stack temperature. If the initial stack temperature is below the freezing point of water, the concentration of methanol in the solution should be sufficiently high to prevent the solution from freezing. For example, if the initial stack temperature is −40° C., a methanol solution having at least 40 wt % methanol is required to prevent freezing of the solution. The methanol concentration can be adjusted as the DMFC stack 3 is heating up. When the initial temperature of the DMFC stack 3 is above the freezing point of water, the preferred methanol concentration in the solution during start-up is in the range of from 0.5 to 25 wt. %, and more preferably the concentration range is from 3 to 10 wt %.

The following examples illustrate the various advantages of the preferred method of the present invention.

EXAMPLES

Example 1

A DMFC stack comprising 6 fuel cells was used in this example. Each fuel cell included an electrode with active area of 100 $cm^2$. The anode catalyst layer was Pt/Ru alloy, 4 $mg/cm^2$ and the cathode catalyst layer was Pt, 4 $mg/cm^2$. DuPont Nafion® 117 was used as the proton conductive membrane and electron conductive carbon cloth was used as diffusion layers for both the anode and cathode. Conductive plates with multiple flow channels were used as the current collecting plates for the anode flow field plate and cathode flow field plate.

The DMFC stack was operated at the following conditions in this example:

| | |
|---|---|
| Methanol solution feed rate: | 30 $cm^3$/min, and |
| Dry air feed rate: | 4.0 Liter/min. |

Figure 2:
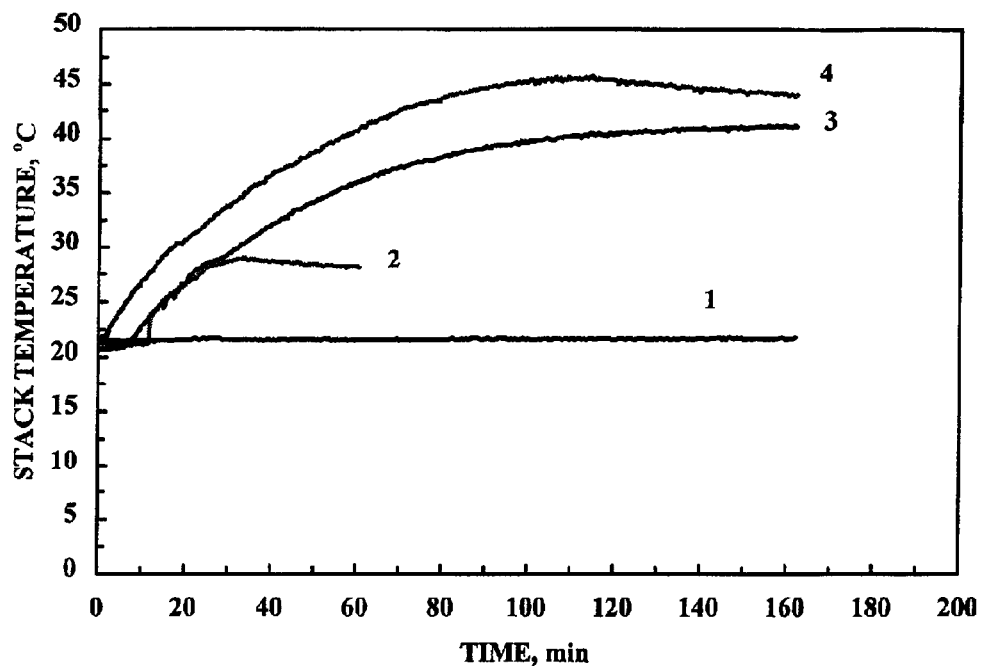
FIG. 2 is a graph showing stack temperature profiles at open circuit state as a function of time and methanol concentration.

No external heat was added to the DMFC stack or fuel stream. The stack was thermally insulated. Aqueous methanol solution was fed to the anode side of the stack at ambient temperature when the stack was at an open circuit state. FIG. 2 shows the temperature profiles at different aqueous methanol concentrations. In this experiment, the fuel stream was not recycled. Therefore, the temperature profiles in FIG. 2 are a single pass heating up profile.

The curves in FIG. 2 illustrate the following:

Curve 1 is the fuel inlet temperature; it is a constant value due to a single pass process.

Curve 2 is the temperature profile of the stack using a methanol concentration of 3.2 wt %.

Curve 3 is the temperature profile of the stack using a methanol concentration of 6.4 wt %.

Curve 4 is the temperature profile of the stack using a methanol concentration of 9.6 wt %.

This example shows that at the same initial conditions, the higher the methanol concentration in the feed solution, the higher the temperature rise of the DMFC stack at an open circuit state.

Example 2

Figure 3:
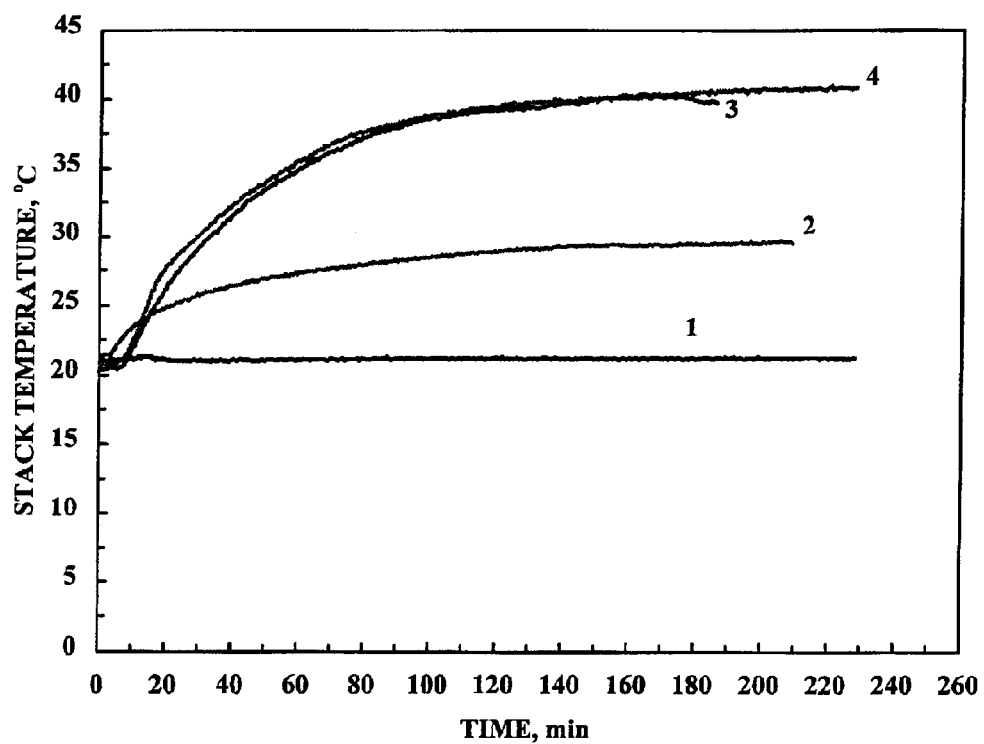
FIG. 3 is a graph showing stack temperature profiles at open circuit state as a function of time and methanol concentration at higher air flow rate.

In this example, all the conditions are the same as those in example 1, except for the air feeding rate at the cathode side of the stack. The air flow rate at the cathode side of the stack was 7.5 SLPM. FIG. 3 illustrates the results. Curve 1 is the inlet fuel temperature and curves 2, 3, and 4 are the fuel outlet temperature profiles, which are the same as the DMFC stack temperature, for the same methanol concentrations as in example 1. Again, the rate of stack temperature rise increases with an increase in methanol solution concentration. However, as shown in FIG. 3, the steady state temperatures are slightly different than those shown in FIG. 2. The increase in cathode air flow rate increases the heat removal capability at the cathode side. In the heating up phase at start-up, it is desirable to reduce the heat removal rate from the stack. Therefore, it is preferred to use a lower feed rate of air, but nevertheless a sufficient rate to support methanol oxidation.

Figure 4:
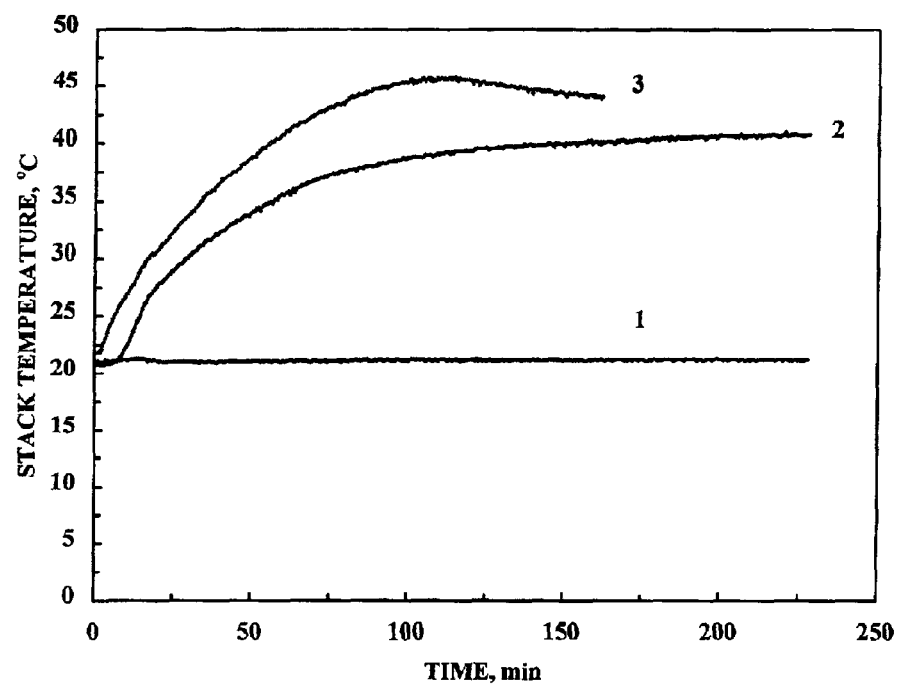
FIG. 4 is a graph showing the effect of air feed rate at the cathode on stack temperature profile.

FIG. 4 further shows the comparison of the temperature profiles using different air flow rates. Curve 1 in FIG. 4 is the inlet temperature of fuel, curve 2 is the stack temperature with air feeding rate of 7.5 SLPM and curve 3 is the stack temperature with air feed rate of 4 SLPM.

Example 3

Figure 5:
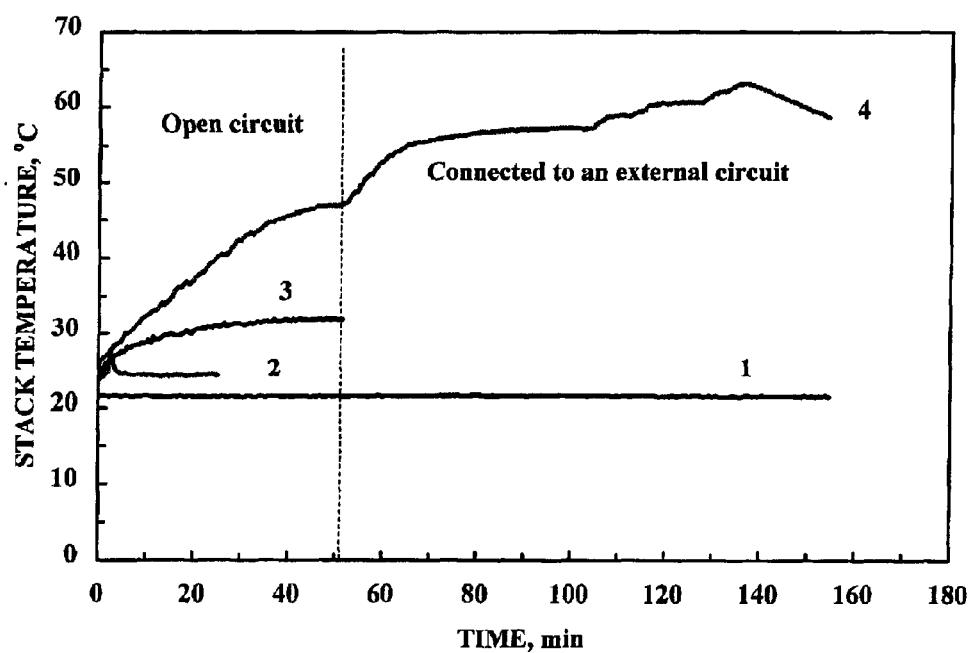
FIG. 5 is a graph showing the effect of fuel feed rate on temperature profile of the stack.

The DMFC stack conditions in this example are the same as those in example 1. Air feed rate at the cathode side was 15 SLPM and the concentration of the aqueous methanol solution fed to the anode side was 9.6 wt %. FIG. 5 shows the effect of the fuel feed rate on stack temperature at start-up. For a single pass process, stack temperature increases faster with a decrease in fuel feed rate. Curve 1 in FIG. 5 shows the fuel inlet temperature whereas curves 2, 3, and 4 are the temperature profiles of the stack for feed rates of 300, 100, and 30 $cm^3$/min, respectively. For a single pass, high fuel feed rate results in an increase in heat removal rate at the anode side.

However, if the fuel stream is recycled, the fuel inlet temperature will increase with time because heated solution is recycled. The temperature profile of the stack will not be significantly affected by the anode feed rate. However, if one wants to heat up the stack faster, a lower fuel feed rate is preferred.

Once the stack is heated up to a desired temperature, the stack may be connected to an external circuit. Thus, the overpotentials due to electrochemical reactions will further heat up the stack. This is shown by curve 4 in FIG. 5 where the stack was connected to an external circuit at 50 minutes.

Figure 6:
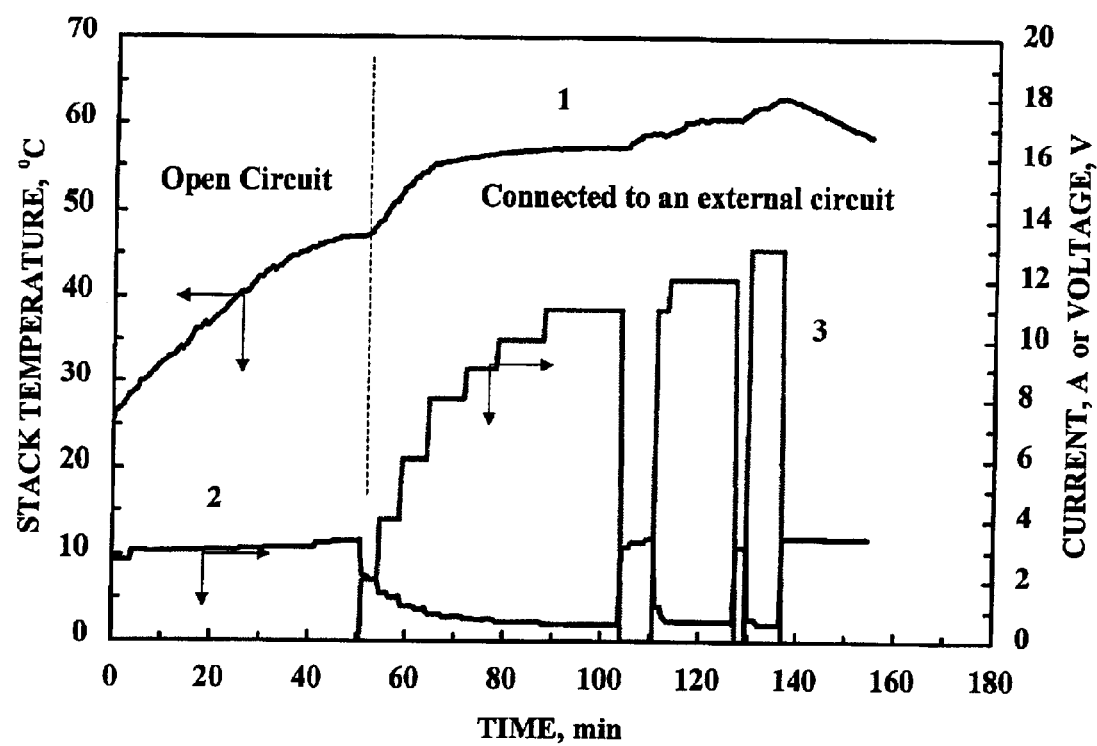
FIG. 6 is a graph showing the effect of connecting to an external circuit on temperature profile of stack.

The temperature profile together with stack power output is shown in FIG. 6. The stack was in an open circuit state for 50 minutes. At 50 minutes, the stack was connected to an external circuit. The temperature in the stack increased further as shown by curve 1 in FIG. 6. After 100 minutes, the stack was cycled by connecting and disconnecting to an external circuit. Stack temperature decreased when the stack was disconnected from the external circuit at 140 to 150 minutes. This further shows that overpotential of electrochemical reactions can provide additional heat to accelerate the heating up process at start-up.

Although the present invention has been shown and described with respect to its preferred embodiments and in the examples, it will be understood by those skilled in the art that other changes, modifications, additions and omissions may be made without departing from the substance and the scope of the present invention as defined by the attached claims.

What is claimed is:

1. A method of heating a fuel cell, wherein the fuel cell comprises an anode comprising an anode flow field plate, an anode diffusion layer and an anode catalyst layer, a cathode comprising a cathode flow field plate, a cathode diffusion layer and a cathode catalyst layer, and a proton conductive membrane, the method comprising the steps of:

(a) operating the fuel cell at an open circuit state, wherein the fuel cell is at an initial temperature;

(b) feeding at a fuel feed rate aqueous fuel solution to the anode and feeding at an oxidant food rate an oxidant to the cathode;

(c) allowing fuel in the fuel solution to diffuse through the proton conductive membrane from the anode to the cathode;

(d) oxidizing the fuel at the cathode to generate heat, thereby heating the fuel cell to an intermediate temperature above the initial temperature;

(e) varying the oxidant feed rate so as to control the heating of the fuel cell; and (f) connecting an external circuit to the fuel cell thereby ceasing to operate the fuel cell in the open circuit.

2. The method of claim 1 wherein the fuel is methanol.

3. The method of claim 2 wherein the fuel solution has a concentration of methanol that is the same as or greater than a second concentration of methanol when the fuel cell is operated under normal conditions.

4. The method of claim 3 wherein the concentration of methanol is in the range of from 0.5 to 25 wt %.

5. The method of claim 3, wherein the concentration of methanol is at least 40 wt % when the initial temperature is less than −40° C.

6. The method of claim 1 wherein the initial temperature is below the freezing point of water and the intermediate temperature is above the freezing point of water.

7. The method of claim 1 further comprising the step of varying the fuel feed rate so as to control the heating of the fuel cell.

8. The method of claim 1 wherein the fuel solution is fed from a fuel reservoir and the method further comprising the step of recycling the aqueous fuel solution back to the fuel reservoir.

9. The method of claim 1 further comprising the step of controlling temperature of the fuel solution fed to the anode.

10. The method of claim 1 comprising a plurality of fuel cells arranged in a fuel cell stack.

11. The method of claim 10 wherein the initial temperature is below the freezing point of water and the intermediate temperature is above the freezing point of water.

12. The method of claim 10 wherein the fuel in methanol.

13. The method of claim 12 wherein the fuel solution has a concentration of methanol that is the same as or greater than a second concentration of methanol when the fuel cell is operated under normal conditions.

14. The method of claim 13 wherein the concentration of methanol is in the range of from 0.5 to 25 wt %.

15. The method of claim 13 wherein the concentration of methanol is at least 40 wt % when the initial temperature is less than −40° C.

16. The method of claim 10 further comprising the step of controlling temperature of the fuel solution fed to the anode.

17. The method of claim 10 further comprising the step of varying the fuel feed rate so as to control the heating of the fuel cell.

18. The method of claim 10 wherein the fuel solution is fed from a fuel reservoir and the method further comprising the step of recycling the aqueous fuel solution back to the fuel reservoir.

* * * * *